United States Patent
Tamburrini et al.

(10) Patent No.: US 6,917,723 B1
(45) Date of Patent: Jul. 12, 2005

(54) OPTICAL DATA READER WITH CONTROL MECHANISM IMPLEMENTED BEHIND THE WINDOW

(75) Inventors: Thomas E. Tamburrini, Eugene, OR (US); Matt D. Schler, Eugene, OR (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

(21) Appl. No.: 09/557,637

(22) Filed: Apr. 25, 2000

(51) Int. Cl.[7] .................................................. G06K 9/20
(52) U.S. Cl. ...................................... 382/317; 382/321
(58) Field of Search ............................... 382/317, 321; 340/555, 674, 511; 235/462.25, 472.01, 462.45, 440, 445

(56) References Cited

U.S. PATENT DOCUMENTS

| | | | | |
|---|---|---|---|---|
| 5,007,691 A | | 4/1991 | Bobba et al. ................ | 350/6.7 |
| 5,309,147 A | * | 5/1994 | Lee et al. .................... | 340/567 |
| 5,682,028 A | | 10/1997 | Coleman ..................... | 235/462 |
| 5,831,529 A | * | 11/1998 | Pantus ......................... | 340/555 |
| 6,084,524 A | * | 7/2000 | Sato ............................ | 340/674 |

FOREIGN PATENT DOCUMENTS

| | | | |
|---|---|---|---|
| EP | 0 323 848 A2 | 7/1989 | ............ G06K/7/10 |
| EP | 0 424 097 A1 | 4/1991 | ........... G01S/17/02 |
| EP | 0 548 958 A2 | 6/1993 | ............ G06K/7/10 |

* cited by examiner

*Primary Examiner*—Anh Hong Do
(74) *Attorney, Agent, or Firm*—Stoel Rives LLP (57) ABSTRACT

In an optical data reader, light is aimed out through a window at objects located in front of the window, and reflections from the objects and/or the window itself are detected. The amount of detected light is compared to one or more expected levels to determine when an object is present in front of the window and/or whether the window is properly installed. The optical reader is controlled based on this determination. Control functions that may be implemented in this manner include, for example, waking up the data reader when an object is detected in front of the glass, and disabling the data reader if the window is removed.

45 Claims, 3 Drawing Sheets

OPTICAL DATA READER WITH CONTROL MECHANISM IMPLEMENTED BEHIND THE WINDOW

BACKGROUND OF THE INVENTION

The field of the present invention relates to optical data readers such as barcode readers. More particularly, the field of the present invention relates to the controlling of optical data readers in response to certain external conditions.

Many conventional optical data readers incorporate circuitry to switch the reader into an inactive or "sleep" mode when the reader is not used for a predetermined time (e.g., one minute). The sleep mode is typically used to reduce power consumption, save energy, and reduce wear and tear on moving components. In flying spot laser barcode scanners, the laser is typically turned off when the scanner is in the sleep mode. Turning the laser off also promotes laser safety by minimizing the chances that the eyes of an operator or a bystander will be exposed to an excessive amount of laser light.

Systems that incorporate a sleep mode require a mechanism to return a sleeping system to the operational mode, i.e., to "wake up" the system. One conventional prior art approach for implementing a wake-up function in a barcode scanner is to use a passive photodetector, aimed into the scanning volume of the scanner, to monitor changes in ambient light, (arriving, e.g., from a ceiling light fixture). When an object is moved into the scanning volume, the shadow of the object will usually fall on the photodetector, thereby changing the amount of ambient light reaching the photodetector. The photodetector output will change in response to the changes in detected light. When a change is detected (e.g., from low light to high light or vice versa), the system switches from sleep mode into the operational mode.

It can, however, be difficult to implement an ambient light detecting system that will reliably wake a data reader up from the sleep state every time an object is passed in the vicinity of the data reader. This is due in part to the wide variety of environments in which the data readers are used, ranging from dimly lit to brightly lit environments.

Because of the difficulty of implementing a wake-up function based solely on detected variations of ambient light, some prior art systems incorporate a manually operated pushbutton wake-up switch. The pushbutton switch is used by the operator to wake up the system whenever the automatic wakeup system fails to operate properly. In some of these prior art systems, the pushbutton switch is also used to control the volume of the read-acknowledgement beeps that are generated after a barcode is successfully read.

Unfortunately, a significant number of additional assembly steps are needed to implement a backup wake-up function using a mechanical pushbutton switch. These include, for example, punching a hole in the data reader chassis, mounting the switch into the hole, providing a wiring harness to connect with the switch, and making the connection between the switch and the harness. When the data reader is used in environments where contamination is possible (e.g., in a supermarket checkout scanner, where spills may occasionally occur), special care must be taken to protect the switch from contamination. These steps may further increase the component cost and the cost of assembly. Due in part to these disadvantages, the inventors have recognized a need for a reliable wake-up system and/or function control system that does not rely on an independently mounted mechanical switch.

Safety is another important consideration in optical data readers. In particular, with laser-based barcode scanners, it is desirable to minimize exposure to laser light.

One specific situation where undesired exposure to laser light can occur is when the window in a console-mounted barcode scanner is removed for servicing (e.g., to replace a scratched window). A current approach for minimizing this risk involves providing two windows: an inner window and an outer window. With this double window configuration, the outer window can be replaced without exposing the laser source, because the inner window remains in its position while the outer window is being replaced. The double window configuration, however, increases the component count, the weight, and the cost of the resulting system, and complicates the manufacturing process. Due in part to these disadvantages; the inventors have recognized a need to reduce the risk of laser light exposure without relying on a double window configuration.

SUMMARY OF THE INVENTION

The present invention in one aspect provides a method and apparatus for controlling an optical data reader based on detected reflections from a light source.

In a preferred embodiment as described herein, control of a data reader is accomplished by illuminating an object located in front of a window with a light source, and detecting the light from the light source that has been reflected by the object. The amount of detected light is compared to an expected amount to determine when an object is present in front of the window, and a data reader control function is initiated in response to the determination. Optionally, the proximity of an object may be determined based on the detected light, and different control functions may be initiated depending on the proximity of the object.

In another preferred embodiment as described herein, control of a console-mounted data reader is accomplished by illuminating a console window with a light source, and detecting the light from the light source that has been reflected by the window. The amount of detected light is compared to an expected amount to determine whether the window is present. If the window is not present, the data reader is disabled. In a preferred variation of this embodiment, only a single console window is used in a console-mounted data reader.

In yet another preferred embodiment as described herein, a data reader apparatus includes a light source and a light detector located behind a window. The light source is aimed to illuminate an object located in front of the window, and the light detector is aimed to detect light from the light source that has been reflected by the object and/or the window. When the amount of detected light exceeds a certain level, an operation of the optical data reader is controlled.

DETAILED DESCRIPTION OF THE PREFERRED EMBODIMENTS

Figure 1A:
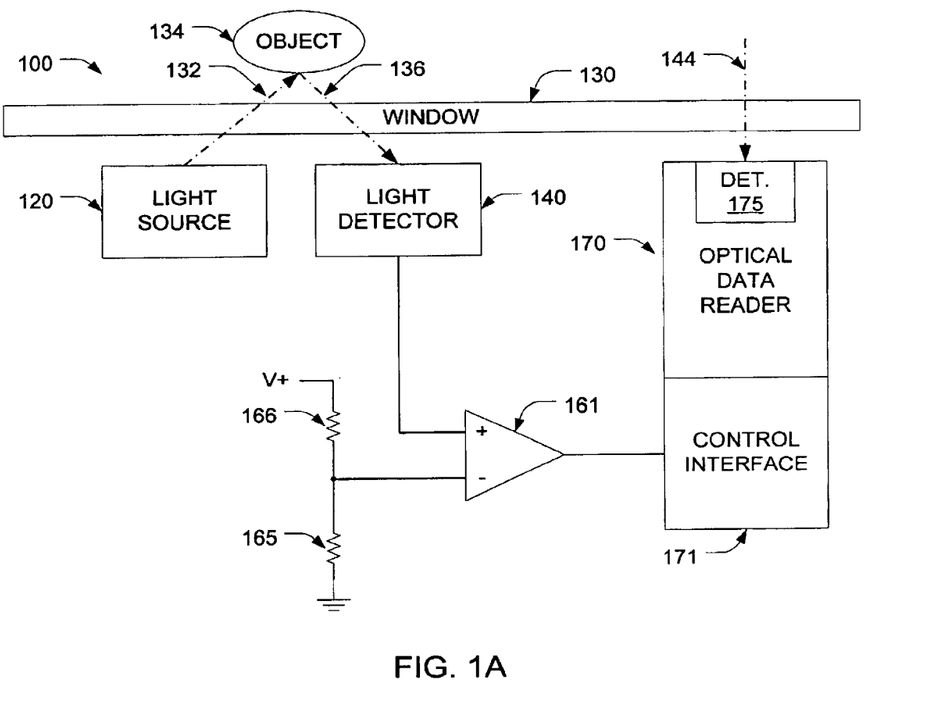
FIG. 1A is a block schematic diagram of a data reader in accordance with a first preferred embodiment as described herein.

FIG. 1A is a block diagram of a preferred data reader system 100 in accordance with one embodiment described herein. The data reader system 100 includes an optical data reader subsystem 170, which may comprise, for example, a flying spot laser barcode reader or a barcode reader with an optical imaging system (e.g., based on a charge-coupled-device (CCD) photodetector). Examples of conventional flying-spot optical scanners can be found in U.S. Pat. No. 5,007,691 (Bobba et al.) and U.S. Pat. No. 5,682,028 (Coleman), hereby incorporated by reference as if set forth fully herein. In alternative embodiments, other types of optical data readers 170 (e.g., readers that recognize alphanumeric characters, other symbols or indicia, or even the overall appearance of an object) may be used.

Figure 1B:
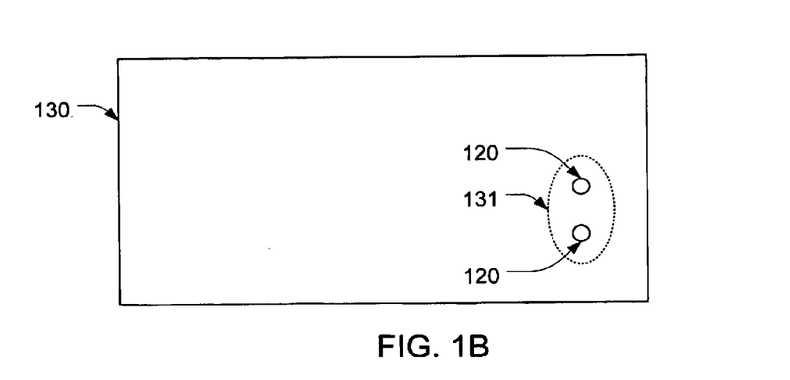
FIG. 1B is a plan view of the FIG. 1A embodiment that illustrates a preferred arrangement of components behind a window.

The optical data reader subsystem 170 includes a photodetector 175 (e.g., a photodiode or a CCD) located behind a window 130, configured to receive an optical input 144 through the window 130. A light source 120 is located behind the window 130, aimed to illuminate objects 134 located in front of the window 130. Preferably, the light source 120, the light detector 140, and the optical data reader 170 are all located behind a window 130 having a single pane (as illustrated in FIG. 1B). In alternative embodiments, these same elements may be located behind different panes of a multi-pane window. A light detector 140 is preferably located behind the window 130, and is aimed to receive light from the light source 120 that has been reflected by objects 134 located in front of the window 130. An output of the light detector 140 is compared to a threshold voltage in comparator 161. The output of the comparator 161 is provided to a control interface 171 which controls certain aspects of the operation of the optical data reader 170, as described below.

The light source 120 may comprise an incandescent lamp, a light emitting diode (LED) connected in series with an appropriate current limiting resistor, or any other suitable light generating device. Light 132 from the light source 120 is aimed outwards through the window 130. Preferably, the window 130 is made of a material (e.g., glass or plastic) that is optically transparent at the relevant frequencies, allowing most of the light 132 to pass through the window 130. When no objects are present in the vicinity of the window 130, the light 132 transmitted through the window 130 will continue outward and will not be reflected back through the window 130. On the other hand, when an object 134 is present in the vicinity of the window 130, the light 132 emitted by the light source 120 will reflect off the object 134 and return through the window 130. The reflected light 136 will then arrive at the light detector 140.

The light detector 140 generates an electrical signal in response to the incoming light 136 that has been reflected from the object 134. The light detector 140 may be implemented, for example, using a light detecting element (e.g., a photodiode) connected to a suitable amplifier in a conventional manner. The light detector 140 generates an output signal that is related to the amount of incoming light. For example, when a photodiode is used together with a transimpedance amplifier, the amplifier will have an output voltage that is proportional to the amount of light arriving at the photodiode. When other types of light detecting elements are used (e.g., a CdS or Si photocell), appropriate changes to the amplifier should be implemented, as well understood by those skilled in the art.

When there is no ambient light, the entire output of the light detector 140 is attributable to the light that originates in the light source 120 and is reflected by the object 134. When no object is present in the vicinity of the window 130, no light is reflected back to the light detector 140. When a reflective object 134 is introduced in the vicinity of the window 130, the light from the light source 120 reflects off the object 134, returns through the window 130, and is detected by the light detector 140. Generally, more light will arrive at the light detector 140 for objects that are closer, and less light will arrive at the light detector 140 for objects that are farther away (assuming the same reflectivity between objects 134).

The light detector 140 generates an output in response to the intensity of the arriving light 136. When no light arrives at the light detector 140, the output of the light detector 140 will be relatively small. When an object 134 is introduced in the vicinity of the window 130, the output will take on a value that depends in part on the proximity and size of the object 134—it will be smaller for distant objects, and larger for nearby objects. In one embodiment, this effect is used to detect the presence and proximity of objects in the vicinity of the window 130 by using comparator 161 to compare the output of the light detector 140 to a predetermined threshold voltage. When the object 134 is sufficiently close to the window 130, the output of the light detector 140 will normally exceed the threshold voltage, and the output of the comparator 161 pril will be asserted (switching to a "high" state in the illustrated embodiment). Conversely, when the object 134 is not sufficiently close to the window 130, the output of the light detector 140 will not exceed the threshold voltage, and the output of the comparator 161 will not be asserted (and will remain in a "low" state in the illustrated embodiment).

In alternative embodiments, the illustrated analog comparators may be replaced with an analog-to-digital converter followed by a digital comparator (not shown), as will be appreciated by persons skilled in the art. The digital comparator may optionally be implemented in hardware or in software. The threshold voltage may be generated in any suitable manner including, for example, dividing a supply voltage in a resistive divider 165, 166, or using voltage reference diode or IC (not shown). The particular level to which the threshold is set will depend on the function being implemented, as explained in more detail below. In embodiments that use a digital comparator, the threshold may be set by providing the desired digital threshold to the comparator, or by setting a desired threshold in software.

The output of the comparator 161 is provided to the control interface 171 of the optical data reader 170. The control interface 171 is configured to initiate a control function when the output of the comparator 161 is asserted.

For example, the illustrated arrangement may be used to implement a volume control function that is actuated when an operator places his hand (or another object) in front of an "active region" 131 (shown in FIG. 1B) of the window 130 in the immediate vicinity of the light source 120 and light detector 140 (e.g., right up against the window 130, or within an inch of the window). Preferably, the active region 131 is marked in a suitable manner or way on the outer face of the window 130. Because actuation is desired only when the operator's hand (or other object) is very close to the active region 131 of the window 130, a relatively high threshold should be selected to implement this control function. With a high threshold, objects at distant and intermediate distances will not reflect sufficient light onto the light detector 140 to exceed the threshold, and only objects in the immediate vicinity of the active region will reflect sufficient light to exceed the threshold.

When the threshold is exceeded, the output of the comparator 161 will be asserted. The control interface 171 recognizes the assertion of the comparator's output, and generates appropriate commands for the optical data reader to implement the desired volume control function, using any suitable technique. For example, the control interface may write a control byte to a volume control register, or adjust a control voltage provided to a voltage-controlled oscillator. Optionally, the control interface may be configured to wait for a predetermined dwell time (e.g. one second) before generating the commands, so that the control function is not initiated by objects being moved across the window.

In another example, the illustrated embodiment may be used to implement a wake-up function that is actuated when an object 134 is introduced in front of the window 130 in the general vicinity of the light source 120 and light detector 140 (e.g., less than about a foot away from the window). For implementing a wake-up function, a threshold should be selected so that the reflected light 136 received from very distant objects 134 does not cause the output of the light detector 140 to exceed the threshold, while the reflected light 136 received from objects 134 in the general vicinity of the window 130 causes the output of the light detector 140 to exceed the threshold. When the threshold is exceeded, the comparator 161 asserts its output. The control interface 171 recognizes the assertion of the comparator's output, and generates appropriate commands for the optical data reader to implement the desired wake-up function, using any suitable technique (e.g., by switching on the power to the laser source and enabling motion of the scanning mirror).

Figure 2:
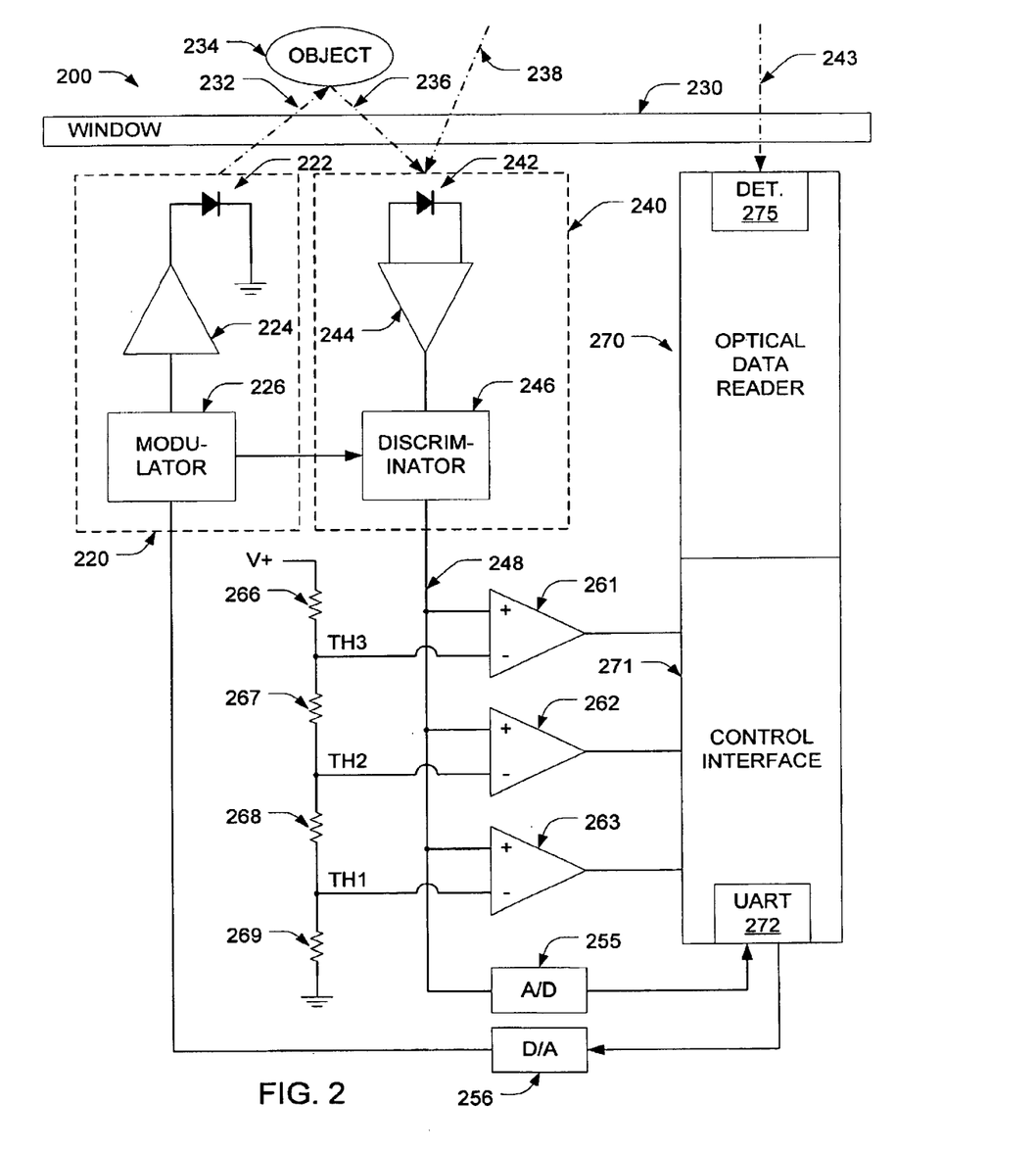
FIG. 2 is a block schematic diagram of a data reader in accordance with a second preferred embodiment as described herein.

FIG. 2 is a schematic block diagram of another preferred data reader system 200, which is similar to the FIG. 1A–1B embodiment, but incorporates a number of additional features. The data reader system 200 includes an optical data reader subsystem 270 including a photodetector 275 located behind a window 230, configured to received its optical input 243 through the window 230. A light source 220 is preferably positioned behind the window 230, aimed to illuminate objects 234 located in front of the window 230. A light detector 240 is located behind the window 230, and is aimed to receive light from the light source 220 that has been reflected by objects 234 located in front of the window 230. An output 248 of the light detector 240 is compared to a set of thresholds applied to comparators 261 through 263. The outputs of the comparators 261 through 263 are provided to a control interface 271, which controls certain aspects of the operation of the optical data reader 270. An optional UART 272 receives an input from the light detector 240 via the A/D converter 255, and controls the light source 220 via the D/A converter 256.

As with the first embodiment, the light source 220 illuminates objects 234 in front of the window 230, and light 236 reflects off those objects and is detected by the light detector 240. In the FIG. 2 embodiment, however, instead of comparing the output of the light detector 240 to a single threshold, a plurality of comparators 261 through 263 are used to compare the output 248 of the light detector 240 to a plurality of thresholds. In an alternative embodiment, the illustrated analog comparators may be replaced by a D/A converter followed by digital comparator (not shown). The digital comparator may be implemented in either hardware or software, as described above in connection with the FIG. 1 embodiment.

The thresholds for the comparators 261–263 may be generated, for example, by choosing series-connected resistors 266 through 269 in a resistive divider network to yield the desired threshold voltages at the negative terminals of each of the comparators 261 through 263, or in any other suitable manner. Alternative techniques for generating multiple threshold levels may also be used, including, for example, generating the thresholds in software in embodiments that use digital comparators.

The comparators 261 through 263 then compare the output 248 of the light detector 240 to each of the three threshold levels simultaneously. In a preferred embodiment, the threshold for comparator 261 is selected to implement a user-actuated function control (e.g., a volume control); the threshold associated for comparator 262 is selected to implement a wake-up function; and the threshold for comparator 263 is selected to implement a glass detection function, as explained below.

Figure 3:
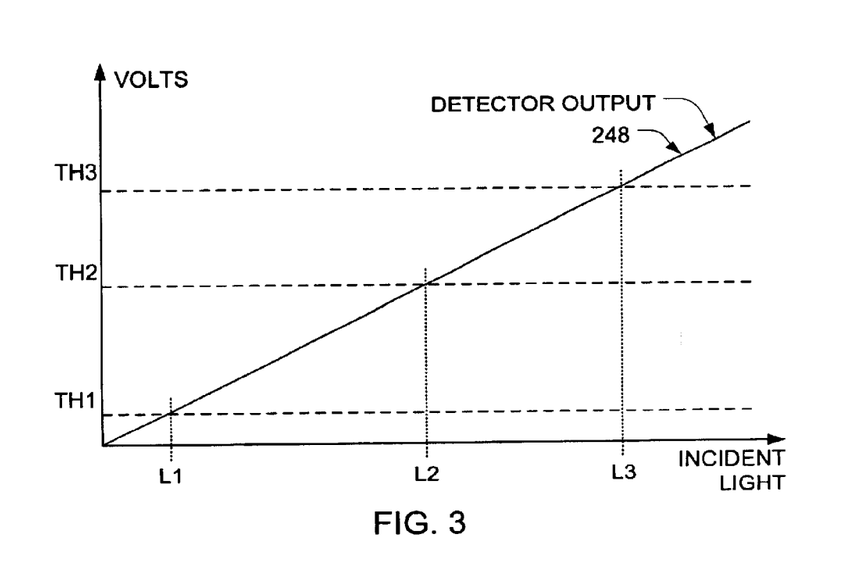
FIG. 3 is a graph of a light detector output in the FIG. 2 embodiment.

Referring now to both FIGS. 2 and 3, when an object 234 is placed immediately in front of an "active region" of the window 230 (i.e., in the immediate vicinity of light source 220 and the light detector 240), the amount of light received by the light detector 240 is generally very large (i.e., greater than level L3). The output 248 of the light detector 240 will be correspondingly large. A threshold voltage TH3 that corresponds to the light level L3 is determined for the comparator 261 (e.g., during initial assembly, by measuring the detector output voltage when a test object 234 is placed one inch in front of the active region), and the determined threshold voltage is provided to one input of the comparator 261. The output 248 of the light detector 240 is provided to the other input of the comparator 261.

During operation, whenever an object 234 with sufficient reflectivity (e.g., a hand) is introduced immediately in front of the active region, a large amount of light will hit the light detector 240, and the output 248 of the light detector 240 will be larger than the threshold TH3. When this occurs, the comparator 261 asserts its output. On the other hand, when no sufficiently reflective object is located immediately in front of the active region, the output 248 of the light detector 240 will be smaller than the threshold TH3, and the comparator 261 will not assert its output. The control interface 271 recognizes when the output of the comparator 261 is asserted, and provides appropriate commands to the optical data reader to initiate the user actuated function control. This arrangement enables a user to initiate a function request by placing a hand (or another object) immediately in front of the active region of the window 230, or by otherwise masking the active region of the window 230.

When an object 234 is placed in the general vicinity of the window 230 active area, the amount of light received by the light detector 240 will be greater than level L2, and the output 248 of the light detector 240 will be of corresponding size. A threshold voltage TH2 that corresponds to the light level L2 is determined for the comparator 262 (e.g., by measuring the detector output voltage when a test object 234 is placed one foot in front of the active region), and the determined threshold voltage is provided to one input of the comparator 262. The output 248 of the light detector 240 is provided to the other input of the comparator 262.

Once the threshold voltage TH2 is established, whenever an object 234 is placed in the general vicinity of the window, an amount of light larger than level L2 will generally be received by the light detector 240, and the output 248 of the light detector 240 will be larger than the threshold TH2. When this occurs, the comparator 262 asserts its output. On the other hand, when no object is present in the general vicinity of the active region, the output 248 of the light detector 240 will be smaller than the threshold TH2, and the comparator 262 will not assert its output. The control interface 271 recognizes when the output of the comparator 262 is asserted, and generates appropriate commands to wake up the optical data reader (assuming that the reader is in the sleep mode). This arrangement enables the implementation of an automatic wake-up command that is actuated whenever an object is passed in the general vicinity of the active region of the window.

When the window 230 is properly positioned in front of the optical reader 270, the light source 220, and the light detector 240, most of the light 232 from the light source 220 passes out through the window 230. A small portion of the light from the light source 220, however, is reflected by the window 230 back toward the light detector 240. Preferably, the window 230 is not coated with a nonreflective coating. The level of the light arriving at the light detector 240 due to these reflections from the window 230 is set in advance to be slightly greater than level L1 in FIG. 3, which corresponds to a threshold voltage TH1. As a result, as long as the window 230 is properly installed, the voltage at the output 248 of the light detector 240 should always be at least as large as TH1, and the output of the comparator 263 should always be asserted. In practice, the threshold TH1 should be selected to be slightly lower than the voltage that corresponds exactly to L1, to compensate for tolerances in the circuit and for the case where the threshold TH1 is exactly equal to the output 248 of the light detector 240. The output of the comparator 263 is provided to the control interface 271 of the optical data reader 270.

The detection of reflections from the above-described window effect can advantageously be used as a glass-absence detector, because the output of the comparator 263 only becomes unasserted when the output voltage of the light detector 240 drops below the threshold TH1 (which ordinarily can only happen when the window 230 has been removed from the system 200). When the control interface 271 recognizes that the output 248 of the comparator 263 is not asserted, the control interface disables the optical data reader. Preferably, the glass-absent condition is latched by the control interface 271 to prevent the optical data reader 270 from operating until the window 230 can be replaced by a technician, so that reflections from external objects will not re-enable the system. When the optical data reader includes a laser (e.g., as in flying-spot laser barcode readers), disabling the reader 270 preferably includes turning off the laser.

Unless appropriate precautions are taken, ambient light 238 arriving at the light detector 240 can be misinterpreted as being light 236 that originated in the light source 220 and was reflected by the object 234, which could make the outputs of the comparators 261 through 263 unreliable. For example, if sufficient ambient light is detected by the light detector 240, the output of the comparator 262 would indicate that an object is present in the vicinity of the window 230 when no object is actually present. Ambient light can be particularly troublesome when glass detection is implemented, because glass detection requires the measurement of relatively low light levels.

The effects of ambient light may be reduced significantly by using a light source 220 that emits only in a very narrow frequency band (e.g., a laser diode) in. combination with a light detector 240 that only detects light in the same frequency band (using, e.g., an optical bandpass filter). But even if this combination is used, the system 200 could still be adversely affected by ambient light 238 that has strong components in the narrow frequency band.

One approach to reject the effects of ambient light 238 (and thereby ensure that all of the light detected by the light detector 240 originated from the light source 220) is to incorporate a modulator 226 into the light source 220 and a matching discriminator 246 into the light detector 240. In the illustrated embodiment, a light emitting diode (LED) 222 is used as the light emitting element in the light source 220. The LED 222 is driven by an amplifier 224, which is controlled by a modulator 226.

The modulator 226 and amplifier 224 combine to generate a driving waveform that modulates the brightness of the light emitted by the LED 222.

Figure 4A:
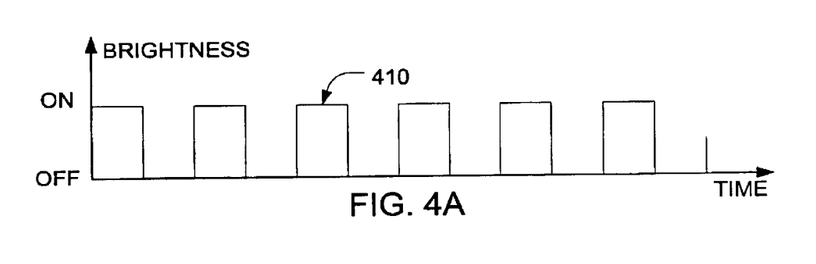
FIG. 4A is a graph of brightness for a first example of a modulated light source output in the FIG. 2 embodiment.
Figure 4B:
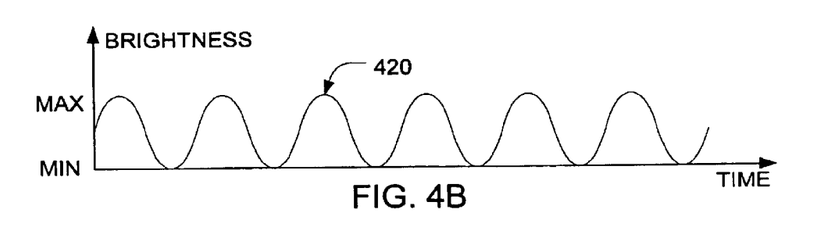
FIG. 4B is a graph of brightness for a second example of a modulated light source output in the FIG. 2 embodiment.

A variety of modulation schemes may be used to generate the driving waveform for modulating the brightness of light emitted by the LED 222. For example, the brightness of the emitted light may be controlled digitally by switching power to the LED 222 on and off at a predetermined frequency, as illustrated by waveform 410 in FIG. 4A. Alternatively, analog control of the brightness of the light emitted by the LED 222 may be implemented by the modulator 226 and amplifier 224 by providing appropriate driving signals to the LED 222 to produce a brightness waveform 420, as illustrated in FIG. 4B. While modulation using numerous other waveforms may be used, (e.g. triangle and ramp waves), the illustrated square wave and sinusoids have the advantage of being relatively easy to implement.

Returning now to FIG. 2, the modulated light 232 leaves the light detector 220 and travels outward through the window 230. A portion of the modulated light 232 is reflected back towards the light detector 240 (by either the window 230 or objects 234), as described above.

Preferably, the light detector 240 comprises a photodiode 242 connected to an amplifier 244 in a suitable manner. For example, a current output obtained from the photodiode 242 may be amplified by a transimpedance amplifier to generate a voltage output that is proportional to the magnitude of the light arriving at the photodiode 242. The output of the amplifier 244 will include a direct current (DC) component that is attributable to the ambient light (this component is DC because the ambient light does not change rapidly). The output of the amplifier 244 will also include a DC component that is attributable to the modulated light from the light source 220 (i.e., the average value of the modulated light), and an alternating current (AC) component that is attributable only to the modulated light from the light source 220.

Preferably, the light detector 240 also includes a discriminator 246 that removes at least some of the components of the arriving light signal that are not attributable to the light source 220. The design of the discriminator 246 will depend on the particular scheme used to modulate the light generated by the light source 220. For example, if the light source is sinusoidally modulated, as illustrated in FIG. 4B, the discriminator 246 may be implemented using a DC blocking capacitor followed by a band pass filter centered on the modulation frequency (e.g., if the modulator 226 modulates at 12 kHz, the center frequency of the band pass filter should also be 12 kHz). A similar filter may also be used even when the light from the light source 220 is modulated by a square wave, as illustrated in FIG. 4A, because the fundamental frequency component of the square wave 410 would be detected by the band pass filter.

Alternatively, other types of discriminators may be used. For example, a demodulator tuned to the same frequency as the modulator may be used to extract the signal arriving at the photodiode 242. In another example (not shown), when the light output of the light source 220 is modulated by a square wave, the discriminator 246 may be implemented by sampling the received light at instants when the light source is on, sampling the received light at instants when-the light source is off, and subtracting the latter sample from the former. This approach works because the first sample corresponds to the light received by the photo diode 242 when illuminated by ambient light plus light originating from the light source 220, and the second sample corresponds to ambient light only (since the light source 220 is instantaneously switched off). The amount of light attributable to the light source 220 can therefore be obtained by subtracting the ambient-only sample from the signal-plus-ambient sample. Preferably, both the modulator 226 and the sampling control in this embodiment (not shown) are synchronized by a suitable signal provided by the modulator to the discriminator.

Optionally, much of the same hardware used to implement the functions described above may also be used to implement a wireless data link into the optical data reader 270. Such a data link may be used, for example, to set system options such as a beep duration or a type of label to be read (e.g., UPC or EAN). It may also be used to initiate diagnostic functions from a remote handheld terminal with an IR interface (e.g., a Palm Pilot™ organizer, available from Palm, Inc.). The wireless data interface may also be used to perform software upgrades for reprogrammable systems (e.g., where the system software is stored in flash memory), without connecting or disconnecting any cables to the scanning system 200.

The wireless data interface may be implemented by using a UART 272 connected to the control interface 271 of the optical reader 270. For data transmissions, the serial output of the UART is provided to the modulator 226 via the D/A converter 256. Preferably, the modulator 226 modulates the light generated by the LED 222 in accordance with any standard IR communication protocol such as Bluetooth™ or an Infrared Data Association (IrDA) protocol. Similarly, to implement data reception using the same photo detector 240 described above, the output of the amplifier 244 may be digitized by A/D converter 255, and the resulting digital data stream may be processed to extract serial data from incoming IR light signals, using any suitable technique.

The above described embodiments advantageously provide a simple and relatively inexpensive way to implement a sleep mode wake-up function and to implement user control of a preselected function, without the drawbacks associated with an independent mechanical switch. In particular, because these functions are implemented optically, the detecting hardware may be built into a data reader module located behind the window, thereby simplifying the assembly process. In addition, by using optical window detection, laser safety concerns can be addressed in a single-window system by turning the laser off when the window's absence is detected. As a result, the drawbacks associated with a double window configuration can be eliminated. Optionally, a wireless data interface may be implemented in a manner that shares a significant portion of the hardware used to implement the light-level detection functions described above.

In one alternative embodiment, the glass-absence detection may be implemented by itself (i.e., without providing wake-up or function control features). The hardware configuration for such an embodiment would be similar to the FIG. 2 embodiment, but would use only one comparator and one threshold voltage. In another alternative embodiment (not shown), digital comparators may be used instead of the analog comparators described above, or the comparators and their outputs may be implemented in software using a suitably programmed digital signal processor to implement level comparisons. Optionally, such processing may be integrated within the control interface 171, 271. Numerous other related embodiments will be readily envisioned by those skilled in the art.

While the present invention has been explained in the context of the preferred embodiments, it is to be understood that various changes may be made to those embodiments, and various equivalents may be substituted, without departing from the spirit or scope of the invention, as will be apparent to persons skilled in the relevant arts.

What is claimed is:

1. A method of controlling a data reader, the method comprising the steps of:

illuminating an object located immediately in front of a specific portion of a window with light from a light source;

detecting an amount of light from the light source that has been reflected by the object;

determining whether an object is present or absent from immediately in front of the specific portion of the window by comparing the amount of light detected in the detecting step to an amount of light expected when an object is present immediately in front of the specific portion of the window; and initiating a data reader control function in response to a determination made in the determining step.

2. The method of claim 1, wherein, the data reader control function is initiated in the initiating step when it is determined, in the determining step, that an object is present immediately in front of the specific portion of the window.

3. The method of claim 1, wherein, the data reader control function is initiated in the initiating step when it is determined, in the determining step, that an object is absent from immediately in front of the specific portion of the window.

4. The method of claim 1, wherein, in the determining step, the determination that the object is present immediately in front of the specific portion of the window is made when an operator's hand is present in an immediate vicinity of the specific portion of the window.

5. The method of claim 4, wherein the control function comprises a volume control function.

6. The method of claim 4, wherein the control function comprises a wake-up function.

7. The method of claim 1, wherein, in the determining step, the determination that the object is present immediately in front of the specific portion of the window is made when an operator's hand is present in a general vicinity of the specific portion of the window.

8. The method of claim 7, wherein the control function comprises a wake-up function.

9. The method of claim 1 wherein the specific region of the window includes markings on the face of the window identifying an active region, wherein the object comprises an operator's hand being positioned in front of the specific portion of the window for initiating a data reader control function.

10. A method of controlling a data reader, the method comprising the steps of:

illuminating an object located in front of a window with light from a light source;

detecting an amount of light from the light source that has been reflected by the object;

determining whether an object is present or absent from in front of the window by comparing the amount of light detected in the detecting step to an amount of light expected when an object is present in front of the window; and initiating a data reader control function in response to a determination made in the determining step, wherein, in the determining step, a first determination is made when the object is present in an immediate vicinity of the window, and a second determination is made when the object is present in a general vicinity of the window, and wherein, in the initiating step, a first data reader control function is initiated when the first determination is made in the determining step, and a second data reader control function is initiated when the second determination is made in the determining step.

11. The method of claim 10, wherein the first control function comprises a volume control function, and the second control function comprises a wake-up function.

12. A method of controlling a data reader having a window, the method comprising the steps of:

illuminating the window with light from a light source;

detecting an amount of light from the light source that has been reflected by the window;

determining whether the window is present by comparing the amount of light detected in the detecting step to an amount of light expected when a window is present; and disabling the data reader if it is determined, in the determining step, that the window is not present.

13. The method of claim 12, wherein the data reader includes a laser, and the step of disabling the data reader comprises the step of turning the laser off.

14. An apparatus comprising: a window having a first region;

a light source positioned behind the window, aimed to illuminate an object located in front of the window;

a first light detector positioned behind the window, aimed to detect light from the light source that has been reflected by the object;

a first comparator that compares an amount of light detected by the first light detector to a first threshold, and asserts a first output when the amount of light detected by the first light detector exceeds a first threshold; and an optical data reader having a second light detector, the second light detector positioned behind the window and aimed to detect light arriving from objects located in front of the window, wherein the optical data reader is controlled by an assertion of the first output.

15. The apparatus of claim 14, wherein the amount of light detected by the first-light detector exceeds the first threshold when an object is present in front of the window in an immediate vicinity of the first region of the window.

16. The apparatus of claim 15, wherein the optical data reader adjusts a volume in response to the assertion of the first output.

17. The apparatus of claim 15, wherein the optical data reader initiates a wake-up function in response to the assertion of the first output.

18. The apparatus of claim 15, wherein the optical data reader is controlled by the assertion of the first output when the assertion of the first output continues for at least one second.

19. The apparatus of claim 14, wherein the amount of light detected by the first light detector exceeds the first threshold when an object is present in front of the window in a general vicinity of the window.

20. The apparatus of claim 19, wherein the optical data reader initiates a wake-up function in response to the assertion of the first output.

21. The apparatus of claim 14, wherein the amount of light detected by the first light detector exceeds the first threshold when the window is installed in front of the light source and the first light detector, and wherein the optical data reader is disabled when the first output is not asserted.

22. The apparatus of claim 21, wherein the optical data reader comprises a laser, and the laser is turned off when the optical data reader is disabled.

23. The apparatus of claim 14, further comprising a second comparator that compares the amount of light detected by the first light detector to a second threshold, and asserts a second output when the amount of light detected by the first light detector exceeds a second threshold, and wherein the optical data reader is controlled by an assertion of the second output.

24. The apparatus of claim 23, wherein the amount of light detected by the first light detector exceeds the first threshold when an object is present in front of the window in an immediate vicinity of the first region of the window, and the amount of light detected by the first light detector exceeds the second threshold when an object is present in front of the window in a general vicinity of the window.

25. The apparatus of claim 24, wherein the optical data reader adjusts a volume in response to the assertion of the first output, and initiates a wake-up function in response to the assertion of the second output.

26. The apparatus of claim 14, further comprising:

a second comparator that compares the amount of light detected by the first light detector to a second threshold, and asserts a second output when the amount of light detected by the first light detector exceeds a second threshold; and a third comparator that compares the amount of light detected by the first light detector to a third threshold, and asserts a third output when the amount of light detected by the first light detector exceeds a third threshold, wherein the optical data reader is controlled by an assertion of the first output, and the optical data reader is controlled by an assertion of the second output.

27. The apparatus of claim 26, wherein the amount of light detected by the first light detector exceeds the first threshold when an object is present in front of the window in an immediate vicinity of the first region of the window, the amount of light detected by the first light detector exceeds the second threshold when an object is present in front of the window in a general vicinity of the window, and the amount of light detected by the first light detector exceeds the third threshold when the window is properly installed in the apparatus.

28. The apparatus of claim 27, wherein the optical data reader adjusts a volume in response to the assertion of the first output, wherein the optical data reader initiates a wake-up function in response to the assertion of the second output, and wherein the optical data reader is disabled when the third output is not asserted.

29. The apparatus of claim 14, wherein a single light detector serves as both the first light detector and the second light detector.

30. The apparatus of claim 14, wherein the first light detector and the second light detector are not the same detector.

31. The apparatus of claim 14, wherein the light source includes a modulator that modulates the light generated by the light source, and wherein the light detector includes a discriminator that detects the modulated light and rejects non-modulated light.

32. The apparatus of claim 31, wherein the discriminator comprises a bandpass filter.

33. The apparatus of claim 31, wherein the discriminator comprises a demodulator.

34. The apparatus of claim 31, wherein the modulator comprises a switch that switches the light source on and off, and the discriminator comprises a subtractor that subtracts a light measurement made when the switch is off from a light measurement made when the switch is on.

35. The apparatus of claim 14, further comprising an optical data receiver that, when a wireless optical data transmission arrives at the light detector from a remote device, monitors the output signal generated by the light detector and extracts data contained in the data transmission from the output signal, wherein the extracted data is provided to the optical reader.

36. The apparatus of claim 35, wherein the optical reader uses the extracted data to configure or to reprogram the optical reader.

37. The apparatus of claim 35, further comprising an optical data transmitter that transmits data from the optical reader to the remote device by modulating the light generated by the light source based on the data being transmitted.

38. The apparatus of claim 14, wherein the optical reader comprises a barcode reader.

39. The apparatus of claim 14, wherein the optical reader comprises a flying-spot laser barcode reader.

40. A method of controlling a data reader, the method comprising the steps of:
   illuminating an object located in front of a window with light from a light source;
   detecting an amount of light from the light source that has been reflected by the object;
   determining whether the amount of light detected exceeds a first threshold and initiating a first data reader control function if it is determined that the first threshold is exceeded;
   determining whether the amount of light detected exceeds a second threshold and initiating a second data reader control function if it is determined that the second threshold is exceeded.

41. A method according to claim 40 wherein the steps of determining comprise simultaneously comparing the amount of light detected to the first and second thresholds.

42. A method according to claim 40 wherein the first data reader control function comprises a wake-up function.

43. A method according to claim 40 wherein the second data reader control function comprises a window detection function.

44. A method according to claim 40 wherein the first threshold is exceeded upon a user placing a hand over the window and first data reader control function comprises a user actuated function.

45. A method according to claim 40 further comprising
   determining whether the amount of light detected exceeds a third threshold and initiating a third data reader control function if it is determined that the third threshold is exceeded.

* * * * *

UNITED STATES PATENT AND TRADEMARK OFFICE
CERTIFICATE OF CORRECTION

PATENT NO. : 6,917,723 B1
APPLICATION NO. : 09/557637
DATED : July 12, 2005
INVENTOR(S) : Thomas E. Tamburrini and Matt D. Schler It is certified that error appears in the above-identified patent and that said Letters Patent is hereby corrected as shown below:

<u>Column 2</u>
Line 16, change semicolon to comma.

<u>Column 4</u>
Line 32, delete "pril" after "161".

<u>Column 9</u>
Line 8, change hyphen to a space.

<u>Column 11</u>
Line 59, change hyphen to a space.

Signed and Sealed this

Twenty-second Day of May, 2007

JON W. DUDAS
*Director of the United States Patent and Trademark Office*